Oct. 14, 1969 — W. S. McCORMICK — 3,473,108
NMR DETECTION APPARATUS FOR USE IN FLUID FLOWMETERS
Filed Oct. 9, 1967 — 3 Sheets-Sheet 1
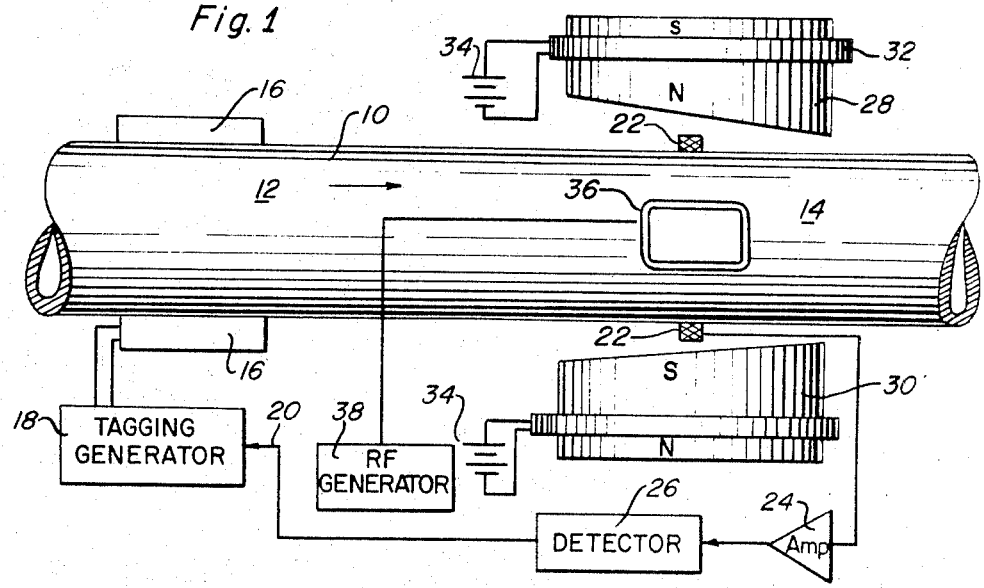
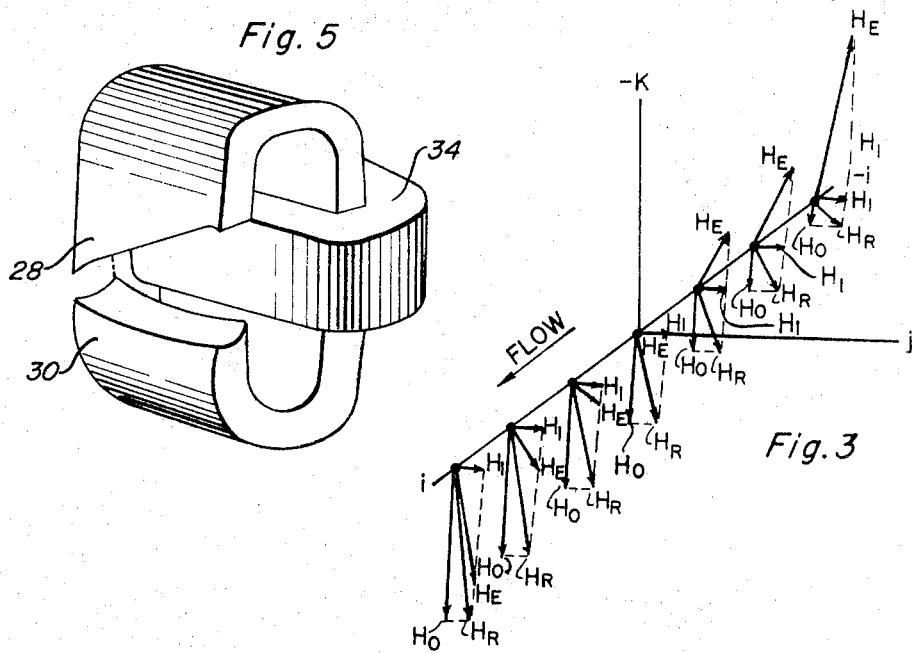
INVENTOR.
WILLIAM S. McCORMICK
BY PENDLETON, NEUMAN
SEIBOLD & WILLIAMS
ATTORNEYS

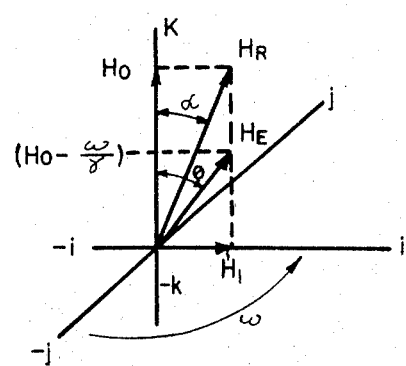
Fig. 2
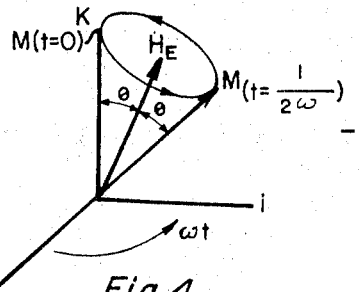
Fig. 4
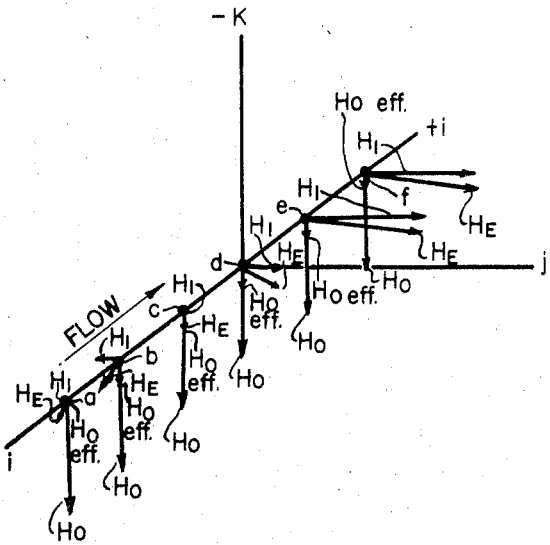
Fig. 8
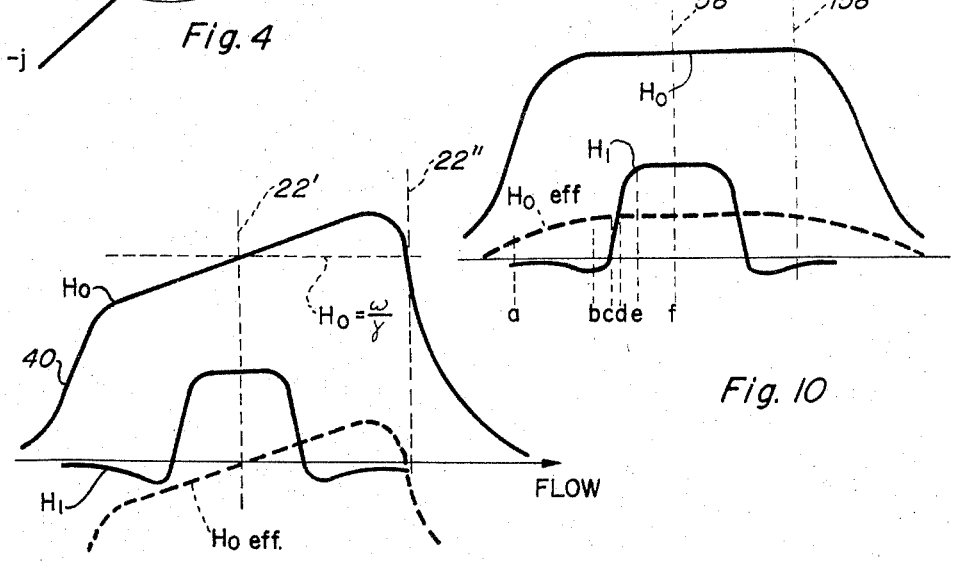
Fig. 6
Fig. 10
INVENTOR.
WILLIAM S. McCORMICK
BY PENDLETON, NEUMAN
SEIBOLD & WILLIAMS
ATTORNEYS 3,473,108
NMR DETECTION APPARATUS FOR USE IN
FLUID FLOWMETERS
William S. McCormick, Madison, Wis., assignor to Badger
Meter Manufacturing Company, Milwaukee, Wis., a
corporation of Wisconsin
Continuation-in-part of application Ser. No. 617,295,
Feb. 20, 1967. This application Oct. 9, 1967, Ser.
No. 673,780
Int. Cl. G01n 27/78; G01r 33/08
U.S. Cl. 324—.5                                    10 Claims

ABSTRACT OF THE DISCLOSURE

This disclosure concerns the detection of nuclear magnetic resonance phenomena in a flowing fluid. A bolus of fluid is tagged, by being given a net magnetization vector, and the tagged bolus is detected at a detection station located downstream from the tagging station. The detection station is located in a region of crossed AC and DC magnetic fields, the amplitudes of both of such fields being substantially constant with time, but varying spatially along the path of the tagged bolus. The frequency of the A.C. field is equal to or nearly equal to the Larmor frequency of the gyromagnetic nuclei in the fluid, so that a resonance condition, detectable by a receiving coil, occurs at the detection station.

---

This application is a continuation-in-part of application Ser. No. 617,295 filed by William S. McCormick on Feb. 20, 1967, for NMR Detection Methods and Apparatus.

This invention relates to methods and apparatus for detecting a net nuclear magnetization vector within a flowing paramagnetic fluid, and more particularly to such methods and apparatus in which the orientation of a magnetic characteristic with which the nuclei are taggered is rotated without time-modulating either the magnetic field at the detection station, or the frequency of the RF field at the detection station.

In many applications employing the nuclear magnetic resonance phenomenon, and particularly in those employing the same for indicating and measuring fluid flow, a net nuclear magnetization of atomic nuclei must be detected. This may be for the purpose of identifying the position of atoms which have been "tagged" by being given a nuclear magnetization, for identifying the time at which the tagged atoms pass a detection station, or even for identifying the existence of such atoms.

One important NMR (or nuclear magnetic resonance) application is in flowmeters in which a bolus of fluid travelling through a flow path is tagged by being exposed to a brief pulse of a unidirectional high intensity magnetic field as it flows past a part of the flow path which will be hereinafter referred to as the tagging station. The tagged bolus is detected as it passes a detection station juxtaposed with the flow path downstream from the tagging station, and the elapsed time between the tagging pulse and the detection of the tagged bolus is inversely proportional to the flow rate. The flow rate may be integrated with respect to time, to yield the total flow, or the signals derived on detection of the tagged boluses may be employed to regenerate tagging pulses, whereby a metered quantity of fluid is indicated by each tagging pulse (and its corresponding detection pulse), and the total flow during any time interval is proportional to the total number of pulses during that interval.

It is desirable to accomplish the detection in such a system in such a way that the maximum signal-to-noise ratio is obtained at the output of the detection system, so that detection of a tagged bolus is unambiguous, and so that the power utilized in generating the tagging pulse is kept to a minimum. Many attempts have been made in the prior art to maximize the signal-to-noise ratio of the output of the detection station, and the accuracy and the efficiency of the apparatus; while minimizing the power required at the tagging station to generate the tagging pulse. Many of these attempts have met with some success, but a great deal of improvement is yet possible.

Accordingly, it is the principal object of the present invention to bring about an increase in the signal-to-noise ratio of the output of the detection station, and a reduction in the power requirement for the tagging pulse at the magnetization station.

Another object of the present invention is to improve the resolution of an NMR detection system by providing an output signal having a frequency equal to the Larmor frequency of the sample under study.

A further object of the present invention is to provide an NMR detection system in which it is unnecessary to modulate the $H_0$ field.

Another object of the present invention is to provide an NMR detection system in which the magnetization vector of a fluid bolus is rotated as it proceeds down a flow path, said rotation being a function of the distance from the detection station and being independent of time.

Other and further objects will become manifest to those skilled in the art upon an examination of the following description and the accompanying drawings and claims.

In one embodiment of the present invention, the detection station employs means for establishing a constant, unidirectional magnetic field transverse to the flow path of paramagnetic fluid, means for establishing a gradient in this field along the flow path in the direction of flow, means for establishing a constant amplitude, alternating, magnetic field in a direction transverse to the direction of the unidirectional field, said alternating field having a frequency of approximately the Larmor frequency near the center of said detection station, and means for detecting resonance of the nuclear magnetization of a tagged bolus of paramagnetic fluid having a nuclear magnetization parallel with the effective field direction at the upstream end of said detection station. The gradient has a value which, in relation to the flow velocity, changes slowly enough to preserve adiabaticity, i.e., the direction of nuclear magnetization maintains a constant angle of precession relative to the effective magnetic field while passing through the magnetic field gradient at the detection station. This system will hereinafter sometimes be referred to as a gradient detection system.

In another embodiment of the present invention, the detection station employs means for generating a constant, unidirectional, magnetic field transverse to the flow path of the paramagnetic fluid, means for establishing a constant amplitude, alternating, magnetic field in a direction transverse to said unidirectional field, said alternating field having a gradient along the flow path with a maximum magnitude near the center of said detection station and decreasing magnitudes near the extremities of said detection station, said alternating field having a frequency near but not equal to the Larmor frequency near the center of said detection station, and means for detecting resonance of the nuclear magnetization of tagged paramagnetic fluid having a nuclear magnetization parallel with the effective field direction at the upstream end of said detection station. The gradient of the alternating field has a value which, in relation to the flow velocity, changes slowly enough to preserve adiabaticity of the nuclear magnetization as the fluid flows past the detection station. This system will hereinafter sometimes be referred to as a profile detection system.

Reference will now be made to the accompanying drawings, in which:

FIG. 1 is a functional block diagram of one illustrative embodiment (gradient detection system) of the present invention;

FIG. 2 is a three-dimensional vector diagram illustrating various vectors involved in the detection system of FIG. 1 for one point along the flow path;

FIG. 3 is a three-dimensional vector diagram similar to FIG. 2, but for a plurality of points along the flow path;

FIG. 4 is a three-dimensional vector diagram illustrating the effect of a relatively large entrance angle between the nuclear magnetization vector and the effective field vector;

FIG. 5 is a perspective view of a device for generating a magnetic field having a longitudinal gradient which may be employed with the embodiment of FIG. 1;

FIG. 6 is an illustration of the amplitude of various magnetic fields, relative to the direction of flow, for the apparatus of FIG. 1.

FIG. 8 is a three-dimensional vector diagram similar to FIG. 3, but illustrating various vectors along the flow path in connection with the embodiment of FIG. 7;

FIG. 10 is an illustration of the amplitude of various magnetic fields, relative to the direction of flow, for the apparatus of FIG. 7.

Figure 7:
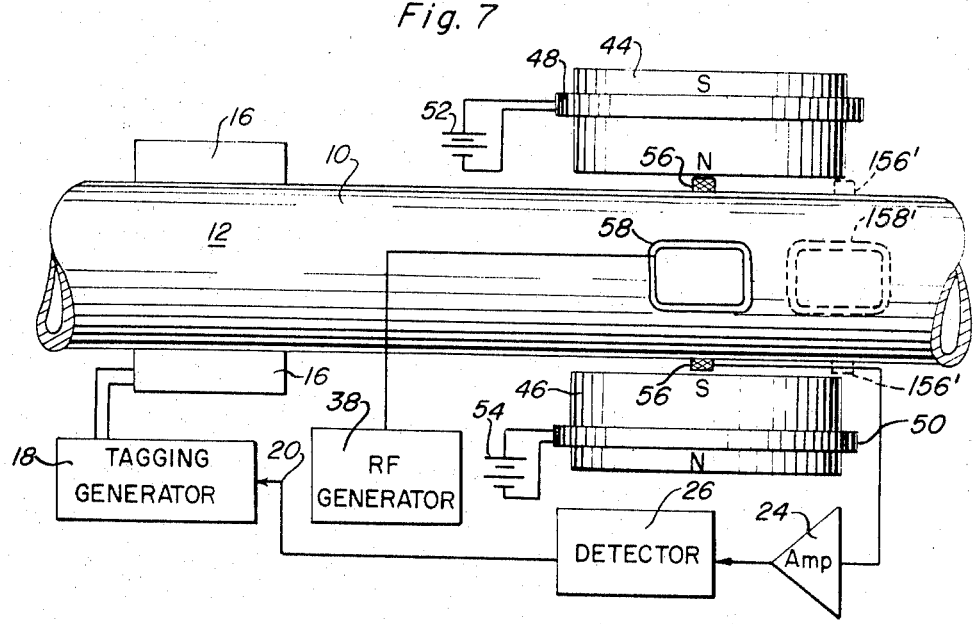
FIG. 7 is a functional block diagram of another illustrative embodiment (profile detection system) of the present invention.

Before describing the particular embodiments of the present invention, some of the principles of nuclear magnetic resonance will be reviewed to serve as a background for discussion of the apparatus and methods embodying the present invention.

When an atomic nucleus having a gyromagnetic moment, such as the nucleus of a hydrogen atom, is exposed to transverse magnetic fields, one of which is a steady DC field and the other an alternating field, the response of the gyromagnetic moment of such nucleus is dependent wholly upon the amplitude of the two fields, and the frequency of the alternating field. Referring to FIG. 2, which is a three-dimensional vector diagram in which the orthogonal directions are identified as $i$, $j$ and $k$, the DC field is represented by a vector $H_0$ extending along the $k$ axis, and the alternating field is represented by vector $H_1$, extending along the $i$ axis. The $H_1$ vector is rotating counterclockwise in the $i$, $j$ plane. It will be convenient to consider that the $i$ and $j$ axes of the diagram illustrated in FIG. 2 are rotating in a positive direction with an angular velocity $\omega$ as shown, where $\omega$ is $2\pi f$ and $f$ is the frequency of rotation of the $H_1$ vector. Thus, the $ijk$ coordinate system is rotating with an angular velocity $\omega$, and this will be referred to hereinafter as the rotating coordinate system.

Within the rotating coordinate system, the resultant of the $H_0$ and $H_1$ field vectors is identified as $H_R$, which forms an angle $\alpha$ with the $k$ axis, where $\alpha$ is $$\tan^{-1}(H_1/H_0)$$

$H_R$ is the resultant field strength at any instant, but does not represent the effective field $H_E$ except when the frequency of $H_1$ is zero.

The orientation of the magnetization vector of a nucleus having a gyromagnetic ratio is affected by an externally applied, constant unidirectional magnetic field, which reacts with the magnetic field generated by the spin of the nucleus. The $\mu$ vector, which describes the direction of the nuclear field, is thereby subjected to a turning moment, the velocity of which is proportional to the product of (1) the intensity of the external field and (2) the sine of the angle between the $\mu$ vector and the external field. This moment causes the $\mu$ vector to rotate or precess about the direction of the external field. The angular velocity $\omega_0$ of this precession is independent of the angle made between the $\mu$ vector and the external field, and so is proportional only to the intensity of the external field. Therefore $\omega_0 = \gamma H$, where $\gamma$ is the proportionality factors, which is the static magnetic susceptibility of the nucleus.

When the external field is made up of two constant, unidirectional field components, such as $H_0$ and $H_1$ illustrated in FIG. 2, the $\mu$ vector attempts to precess simultaneously about both field components. As the two field components are orthogonal, however, the $\mu$ vector cannot maintain a constant angle with both of them, so it, instead, precesses about an effective field $H_E$ disposed in the plane of and between the two field components $H_0$ and $H_1$. The precession of the $\mu$ vector about the effective field $H_E$ may be considered as the simultaneous resultant of attempted precession about both the $H_0$ and $H_1$ fields separately.

As has been noted above, the $H_1$ vector is not normally a constant, unidirectional field, but rather an alternating one. When the frequency $\omega/2\pi$ of the $H_1$ field is zero, the effective field $H_E$ is the same as the resultant $H_R$ of the $H_0$ and $H_1$ fields. When $\omega$ is finite, however, the effective field $H_E$ is displaced from $H_R$ in a clockwise direction as illustrated in FIG. 2.

In FIG. 2, the $i$, $j$ plane rotates about the $k$ axis with an angular velocity $\omega$ in the same direction as the vector attempts to rotate about the $H_0$ component. As the precessional angular velocity is $\gamma H_0$, the apparent angular velocity in the rotating coordinate system is less, namely: $\gamma H_0 - \omega$. This corresponds to normal precession about an $H_0$ field which has been reduced in amplitude by $\omega/\gamma$. Therefore, the effective magnitude of the $H_0$ field in the rotating coordinate system is $$H_0 - \frac{\omega}{\gamma}$$

and the effective field $H_E$ is the resultant of this factor, and the alternating component $H_1$, as illustrated in FIG. 2. When $\omega = \gamma H_0$, $$H_0 - \frac{\omega}{\gamma} = 0$$

and the effective magnitude of $H_0$ is zero. Thus $H_E$ is collinear with $H_1$. This condition is referred to as "resonance."

In the embodiments described hereinafter, the detected output is responsive to the magnitude of the component of $H_E$ in parallel with the $H_1$ direction since the $\mu$ vectors are in parallel with the $H_E$ vector. The term "resonance" will be employed to mean a condition in which there is any detectable component of the $\mu$ vector in the $H_1$ direction, although the maximum response is attained when the $\mu$ vectors are parallel to $H_1$.

The above discussion of the behavior of the $\mu$ vector is true for an ensemble of many such vectors, found in a bolus of paramagnetic fluid. In such a fluid, however, thermal and other effects prevent all the nuclei from being aligned in parallel with each other, and in general the orientation of the individual $\mu$ vectors within the ensemble are quite random, except that a small but significantly greater proportion of the nuclei have orientations in which their $\mu$ vectors have components in a given direction as opposed to the opposite direction, which produces a net magnetization vector M for the entire ensemble in that direction. The behavior of the M vector in the presence of external magnetic fields is the same as that of the individual $\mu$ vectors, so that for most purposes it may be considered representative of a group of nuclei having their vectors parallelly aligned.

Referring now to FIG. 4, the precession of a gyromagnetic moment M about an effective field vector $H_E$ is illustrated. At one time, the M vector is collinear with the k axis, and at a time ½ω later, the M vector has described one half of a revolution of precession about $H_E$ and is located in the $k, i$ plane displaced from the $k$ axis by $2θ$, always maintaining an angle of $θ$ with the $H_E$ vector.

As more fully described hereinafter, it is desirable to reduce the angle $θ$ which the M vector makes with the $H_E$ vector when the tagged fluid first comes into the vicinity of the detection station. Neglecting relaxation mechanisms, which in flow detectors are so slow as to have a negligible effect, the angle $θ$, between M and $H_E$, remains constant, as long as the orientation of $H_E$ does not change rapidly with respect to time. If $dθ/dt \ll ω_0$, $θ$ is substantially constant, and this condition, sometimes referred to as the adiabatic condition, is satisfied in the operation of the present invention.

In flowmeters employing nuclear magnetic resonance, a bolus of fluid is tagged at a tagging station by being given a distinctive M vector, and this magnetization vector is thereafter detected at a detection station by observing resonance at that station. Resonance is commonly induced by modulating the amplitude of the $H_0$ field, while maintaining $ω$ constant, until resonance is reached when $H_0 = ω/γ$.

This value of $H_0$ is achieved twice during each modulation cycle, and only at these times can a tagged bolus be positively identified. Accordingly, the information rate of such a detector system is limited to the second harmonic of the modulating frequency. This is a relatively poor resolution and limits the precision of such detection systems.

Another limitation of the prior art detection systems, which are hereinafter sometimes referred to as adiabatic fast passage detection systems, is that the continuous time-modulation of the $H_0$ field tends to rotate the gyromagnetic moment vectors of the new nuclei from the $k$ axis through the $i$ axis to the minus $k$ axis, and then back to the $k$ axis in a repetitive, oscillatory manner. It is only necessary, however, to rotate the gyromagnetic moments from the $k$ axis to the $i$ axis in order to bring about the resonance condition in which the tagged bolus may be identified.

A third disadvantage of the prior art adiabatic fast passage detection systems is that the magnetization vectors of the nuclei entering the detection station do not have any predetermined relationship with the $H_E$ vector, since the modulation of the $H_0$ vector is not synchronized in any respect with the entry of the nuclei into the vicinity of the detection station. As a result, entering nuclei may have an initial angle of precession with the $H_E$ vector of anywhere from zero to 180°. Such nuclei having angles of 90° or greater with the $H_E$ vector tend to destructively interfere with the resonance of nuclei having an angle of less than 90° with the $H_E$ vector, so that a relatively weak resonance signal is observed. It can be shown that the maximum resonance signal is achieved when the maximum number of nuclei have magnetization vectors which are aligned parallelly to the $H_E$ vector. As long as the adiabatic condition is fulfilled, that is, the time rate of change of the angle which the $H_E$ vector makes with the $k$ axis is much less than the angular velocity of precession of the gyromagnetic moments about the $H_E$ vector, the initial angular relationship between the gyromagnetic moment vectors and the $H_E$ vector is maintained for the entire period during which the nuclei remain in the influence of the crossed $H_0$ and $H_1$ fields. Hence, it is desirable that the initial angle formed between the gyromagnetic moments of the nuclei and the $H_E$ vector, is zero (i.e. and $H_E$ vector is collinear with the $k$ axis for nuclei entering the detection station) and the rotation of the $H_E$ vector into the $i, j$ plane, where the resonance condition can be most readily observed, is adiabatic so that the initial angle can be preserved.

In the two embodiments of the present invention, which will now be described, these conditions are more satisfactorily satisfied than in the prior art adiabatic fast passage detection systems.

In the present invention, one or both of the magnetic fields extending through the flow path at the detection station are deliberately made longitudinally inhomogeneous so that there is a field gradient within the flow path. The field is homogeneous in a radial direction. This condition is contrary to the teaching of the prior art, in which magnetic field homogeneity was constantly sought. The gradient is fixed in space and invariant with time, and the motion of the nuclei themselves causes the rotation of the $H_E$ vector of the field acting on the nuclei, as they are swept toward, and past, the detection station by the flow stream.

Referring now to FIG. 1, there is illustrated a conduit 10 through which paramagnetic fluid is flowing rightwardly as illustrated in FIG. 1. A tagging station is juxtaposed with the conduit 10 at a location 12, and a detection station 14 is located downstream from the tagging station 12.

At the tagging station 12 is provided field generating means 16 connected to a tagging generator 18 for the purpose of giving gyromagnetic nuclei within the vicinity of the tagging station 12 an oriented magnetization so that the fluid, as a whole, attains a magnetization M. For convenience, the M vector may be considered to be in the positive $k$ direction as illustrated in the vector diagram of FIG. 3, which represents the orientation and magnitude of certain vectors with respect to distance down the conduit 10, and the motion of the fluid may be considered to be in the $i$ direction. The tagging generator may conveniently be a pulse generator which is actuated through an input line 20, in response to a tagged bolus being detected at the detection station 14.

When a bolus is detected, a signal is generated in a receiving solenoid coil 22, amplified by a wide band amplifier 24 and demodulated by a detector 26. The output of the detector 26 is connected to the input line 20 of the generator 18, to regenerate a tagging pulse for each detected bolus. In this manner, the operation of the apparatus is repetitive and self-sustaining. Thus, as shown, the arrangement is similar to that disclosed and claimed in Genthe et al. application Ser. No. 485,842, filed Sept. 8, 1965. The novel aspects of the present invention reside specifically in the apparatus at the detection station.

At the detection station 14, a steady unidirectional field $H_0$ is generated by opposed pole pieces 28 and 30, which are diametrically arranged relative to the conduit 10. The pole pieces 28 and 30 each have a coil 32 energized by a battery 34, to generate magnetic flux. The $H_0$ field generator may be conveniently of the form illustrated in FIG. 5. As shown in FIG. 5, the pole pieces 28 and 30 may be opposite ends of a continuous ferromagnetic member, with a single coil 34 surrounding the member at any convenient location. Application of direct current through the coil 34 produces the desired $H_0$ field between the pole pieces.

The facing surfaces of the pole pieces 28 and 30 are not parallel, but, on the contrary, are beveled to generate a non-uniform $H_0$ field. At the end where the facing surfaces are closest together, the reluctance of the intervening space is less, resulting in a more intense $H_0$ field than at the opposite end of the facing surfaces where the reluctance is higher.

A coil 36 is secured to one side of the conduit 10 by cementing or the like, and is connected to an RF generator 38 to produce an alternating magnetic field within the conduit 10 in the vicinity of the receiving coil 22. There is preferably another coil (not shown) identical to the coil 36, disposed diametrically opposite the conduit from the coil 36 and connected in series aiding relationship, to strengthen the transverse RF field through the conduit 10. The RF generator 38 produces a signal having a frequency substantially equal to the Larmor frequency of nuclei within the central portion of the area between the pole pieces 28 and 30, near the receiving coil 22. Thus $f = \gamma Hm/2\pi$, where $Hm$ is the field strength of the $H_0$ field midway between the upstream and downstream ends of the pole pieces 28 and 30.

At the upstream end of the detection station 14, the $H_0$ eff. field, aligned in the $k$ direction, is much more intense than the $H_1$ field, as illustrated in FIG. 6. The nuclei retain their alignment in the $k$ direction, derived from the tagging field generator 18 as they enter the vicinity where the amplitude of the $H_1$ field, generated by the coil 36, reaches its maximum level, while the amplitude of the $H_0$ field (FIG. 6) is still less than $2\pi f/\gamma$, where $f$ is the frequency of the output of the RF generator 38. While the amplitude of the $H_1$ field is relatively constant, the amplitude of the $H_0$ field increases gradually, passing through resonance at the coil 22, where the quantity $$H_0 - \frac{\omega}{\gamma} \text{ (or } H_0 \text{ eff.)}$$

passes through zero, indicated by dashed line 22′ in FIG. 6. A second resonance occurs at 22″, but the amplitude of $H_1$ at this point is too low to produce a significant output signal, and this point is also relatively remote from the coil 22.

The change in the direction of effective field $H_E$, as the nuclei pass through the detection station where the $H_1$ field is relatively constant, is illustrated in FIG. 3. As the frequency of the RF generator 38 is equal to the Larmor frequency of the nuclei at the center part of the illustration in FIG. 3, there is no component of $H_E$ in the $k$ direction and the $H_E$ vector is aligned with the $H_1$ vector. Thus, if a substantial proportion of the nuclei are aligned with the $H_E$ vector, so that the M vector is so aligned, a voltage is induced in the receiving coil 22, due to the rotation of the M vector (with respect to space) along with the $H_1$ vector at the Larmor frequency.

As the M vector of the tagged nuclei enters the influence of the $H_0$ field, aligned generally parallel with $H_E$, the M vector will remain so aligned as long as adiabaticity is maintained. The rotation of the M vector, with the $H_E$ vector, is detected by a voltage induced in the receiving coil 22.

The $H_0$ field gradient within the area of the detection station changes at such a slow rate, relative to the flow velocity of the fluid within the conduit 10, that the adiabatic condition is fulfilled, and the nuclei maintain their initial alignment with the $H_0$ eff. field direction. As this was initially in the $+k$ direction, the gyromagnetic moments of the individual nuclei remain lined up substantially in parallelism with the $H_E$ vector. This remains true as the $H_E$ vector rotates, as illustrated in FIG. 3, relative to a tagged bolus of fluid, as that fluid flows past the detection station 14.

The signal generated by the receiving coil 22 is an index of the presence of fluid within the detection station 14 which has been tagged by being given a net magnetization vector M at the tagging station 12. When untagged fluid is flowing through the detection station 14, no signal is generated because the gyromagnetic vectors, being randomly oriented, remain substantially so throughout their traverse of the conduit 10. The amplitude of the $H_0$ field to which nuclei are exposed prior to reaching the detection station 14 is not sufficient to bring about any significant polarization of the gyromagnetic vectors, at the velocity at which fluid is flowing in the conduit 10.

From the foregoing description, it is apparent that the apparatus of FIG. 1 provides an NMR detection system in which there is no necessity for time modulating either the frequency of the $H_1$ field or the amplitude of the $H_0$ field, as in the past. In addition, the desirable mode of operation in which each tagged bolus of fluid enters the influence of the detection apparatus with its M vector in parallelism with the $H_0$ field of the detection station, and the M vector is rotated only once by 90° to achieve the resonance condition which is sought to be detected.

The apparatus of FIG. 7 accomplishes the objects of the present invention while achieving further advantages in operation. The $H_0$ field may be substantially constant in the vicinity of the detection station, eliminating the need for the inclined pole faces as illustrated in FIG. 1, and the operation of the apparatus of FIG. 7 is not subject to variations in the frequency of the RF generator. First of all, any drift in the frequency of the RF generator 38 tends to shift the position of resonance longitudinally in the conduit 10, which in turn affects the accuracy of a flowmeter incorporating this embodiment of the present invention. Secondly, the need to provide the $H_0$ field gradient by means of inclined pole faces, as illustrated in FIG. 1, or by the use of an additional winding arranged to provide a longitudinal gradient (as for example by overlapping turns of a generally two-dimensional saddle coil like the coil 36, etc.) increases the cost and complexity of the equipment involved. The second circumstance, of course, does not apply to an arrangement in which the $H_0$ field gradient employed is the fringing field at one end of the $H_0$ field generating means (for example the location corresponding to the area 40 of the curve of FIG. 6). Nevertheless, the frequency dependence of the point of resonance is eliminated in the alternative embodiment, which is referred to herein, as the profile detection system.

Referring now to FIG. 7, the profile detection system comprises a conduit 10 for conducting fluid sequentially past a tagging station 12 and a detection station 14. A tagging generator 18 is connected to a tagging field generating means, all of which is the same as the embodiment illustrated in FIG. 1.

A uniform $H_0$ field is produced between pole pieces 44 and 46, which are illustrated in FIG. 7 as having energizing coils 48 and 50, respectively, connected to sources 52 and 54 of DC voltage. The pole pieces 44 and 46 are preferably provided with a low reluctance magnetic circuit interconnecting them, as in the arrangement of FIG. 5, and may also have a single energizing coil.

A solenoid type receiving coil 56 is provided, surrounding the conduit 10 in the vicinity of the detection station 14, and the coil 56 is connected to an amplifier 24 and detector 26, as in FIG. 1. The $H_1$ field is generated by a saddle coil 58, which is centrally located relative to the coil 56 and the pole pieces 44 and 46.

Figure 9:
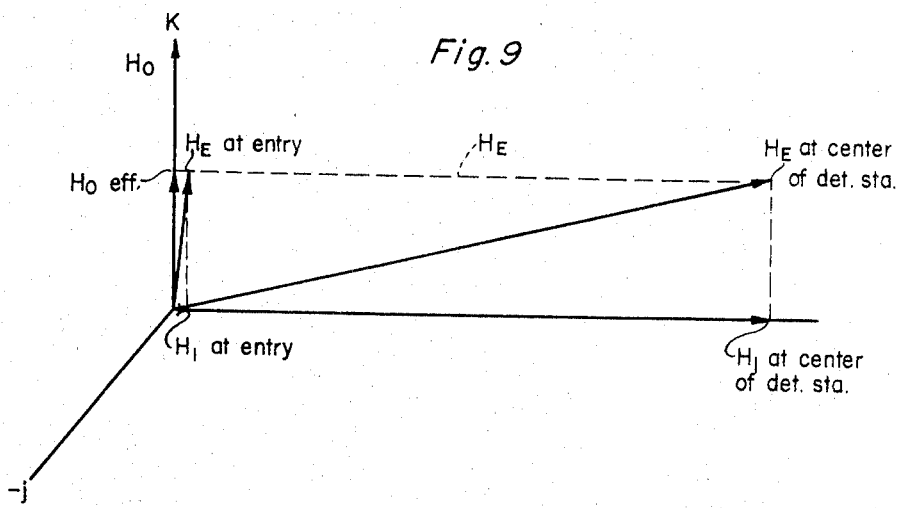
FIG. 9 is a vector diagram illustrating the relationship of the relative amplitudes of the $H_1$ vector at entry, and at passage through the center portion of the detection station of the apparatus illustrated in FIG. 7.

FIG. 10 illustrates the relative amplitudes of the $H_0$ and $H_1$ fields, with respect to the longitudinal dimension of the conduit 10, and also shows the effective $H_0$ field relative to the longitudinal dimension of the conduit 10. FIG. 8 is a three dimensional vector diagram, illustrating the relationship of $H_1$, $H_0$ and $H_E$, within the area of the receiving coil 56. From FIGS. 8 and 10, it is apparent that the amplitude of the $H_1$ field is small, relative to that of the $H_0$ eff. field, at position $a$ as the nuclei enter the detection station 14, and therefore $H_E$ is nearly parallel to $H_0$. The frequency of the $H_1$ field is slightly off resonance, so that the effective $H_0$ field ($H_0$ eff.) is $$H_0 - \frac{\omega}{\gamma}$$

a small fraction of $H_0$, and this is substantially constant throughout the central part of the detection station 14, as illustrated in FIG. 10. As illustrated in FIG. 9, the effective value of the $H_0$ field ($H_0$ eff.) is also much larger than the amplitude of $H_1$ at entry of the nuclei into the detection station 14, so that $H_E$ is aligned in parallel with the M vector with which entering nuclei have been tagged.

Farther down the conduit, at position $b$, the amplitude of the $H_1$ field rises and then decreases to zero at position $c$, with the result that $H_E$ is shifted slightly and then brought into alignment with $H_0$ eff., whence $H_E$ is equal to $H_0$ eff. Thereafter, at positions $d$ and $e$ of FIGS. 8 and 10, the magnitude of $H_1$ increases until at positions $e$ and $f$ the $H_1$ amplitude is much larger than $H_0$ eff., and, as shown in FIG. 9, $H_E$ is generally parallel to $H_1$. This will be recognized as a coherent resonance condition, and a detectable signal is generated in the receiving coil 56, the center of which is represented by the line 56′ in FIG. 10, indicating the passage of a tagged bolus. Although maximum signal output is attained when $H_E$ is rotated into parallelism with $H_1$, a usable signal may be derived for conditions in which $H_E$ is not rotated quite so far.

The amplitude of the $H_1$ field, downstream from the receiving coil 56 (FIG. 10), falls, then rises slightly and falls again with the opposite sign. This occurs downstream from the location of greatest sensitivity of the receiving coil 56, which is located near position $f$, so the operation of the system is not adversely affected thereby.

The rate of change of the direction of the $H_E$ vector is slow enough to preserve adiabaticity as the fluid moves down the conduit 10, through the fringing profile of the field produced by the $H_1$ coil 58. For slow moving fluids, adiabaticity is maintained at all locations along the conduit, but for rapidly moving fluids, the rate of increase in amplitude of the $H_1$ field, relative to the longitudinal dimension of the conduit 10 must be kept equal or less than a maximum value, dependent upon the rate of flow. The rate of increase of the $H_1$ field may be lessened by moving the $H_1$ generating coil 58 further downstream, and making a compensating increase in the amplitude of the $H_1$ field. The length of the pole pieces 44 and 46 may also be extended, and the placement of the receiving coil 56 modified to cooperate with a more downstream location for the $H_1$ generating coil 58.

As indicated above, the frequency $f$ of the RF generator 38 is chosen so that $$H_0 >> H_0 - \frac{2\pi f}{\gamma} >> H_{1i}$$

where $H_{1i}$ is the amplitude of the $H_1$ field as the nuclei enter the detection station 14. If $$H_0 - \frac{2\pi f}{\gamma}$$

is too small, in relation to the rate of change of $H_1$, adiabaticity cannot be maintained, because of the rapid shift of the $H_E$ vector. This results in a weak output signal. As $$H_0 - \frac{2\pi f}{\gamma}$$

is made slightly larger, without changing the $H_1$ field conditions, the rate of rotation of the $H_E$ vector is reduced until eventually adiabaticity is achieved. Any further increase in $$H_0 - \frac{2\pi f}{\gamma}$$

merely operates to reduce the angle through which $H_E$ rotates, and brings about a decrease in the derived output signal from the system. Thus there is an optimum value of the frequency of the RF generator 38, which is displaced from the Larmor frequency. Experimentally, it has been determined that the optimum value of frequency was such as to satisfy the relation $$\frac{2\pi \Delta f}{H_1} = .02$$

where $\Delta f$ is the deviation, in cycles per second from the Larmor frequency, and the amplitude of the $H_1$ field nearest the center of the receiving coil was 0.5 gauss, the velocity of fluid flow was 10 feet per second, and the fluid had a $T_1$ (or longitudinal relaxation time) of about 1.0 second.

The effect of inhomogeneity of the $H_0$ field, which in prior art NMR detectors has resulted in a low signal-to-noise ratio, is reduced by employing a relatively large $H_1$ field with either embodiment of the present invention.

It is apparent that in the profile detector embodiment of FIG. 7, the apparent time of passage of a tagged bolus from the tagging station to the detection station is not frequency dependent, and hence the accuracy of the system is not affected by slight shifts in the frequency of the RF generator 38. As pointed out above, there is an optimum frequency for a maximum output signal, but the time of occurrence of an output from the receiving coil 56 is wholly dependent upon the geometry of the structure, which in a typical application remains fixed.

Although in the embodiment of FIG. 7, the $H_1$ generating coil is positioned so that the peak value of the $H_1$ profile falls within the region of substantially constant $H_0$ field, my invention also contemplates modifying this system by placing the centers of the $H_1$ coil 58 and the receiving coil 56 opposite the downstream end of the pole pieces 44 and 46 as illustrated by the dotted lines 156' and 158' in FIG. 7. This has the effect of shifting the profile of the $H_1$ field so that the resonance signal is produced near the downstream end of the region of constant $H_0$ field in response to the presence of a tagged bolus at the portion of the $H_1$ profile indicated at position $b$ in FIG. 10. As so modified, the length of the conduit 10 required to have a fairly uniform $H_0$ field is shortened, so that the $H_0$ generating means may be made smaller if desired, and the effect of any inhomogeneity of the $H_0$ field is lessened. The shortening of the required length of uniform $H_0$ field also allows the resonance to occur at a point closer to the tagging station 12, when desired. This also tends to reduce the effect of field inhomogeneities. One further advantage of the modified system is that the slope of the rising $H_1$ profile between positions $a$ and $b$ as indicated in FIG. 10 is more gradual than between positions $b$ and $e$ as indicated in FIG. 10. As it is important to maintain adiabaticity until the resonance condition is achieved, the modified system can be employed effectively with fast moving fluids. The disadvantages of the modified system are that a larger $H_1$ generating coil is required, to raise the amplitude at position $b$ of the profile to a value much larger than the value of $H_0$ eff. and the peak value of the $H_1$ field at position $b$, where resonance occurs in the modified system, is sustained for only a relatively short time, which tends to reduce the amplitude of the output signal.

It will be appreciated that many modifications may be made in the apparatus as disclosed in FIGS. 1 and 7. For example, although the receiver coils 36 and 58 have been illustrated in FIGS. 1 and 7 as being short in their axial dimension, relative to the $H_1$ coils 36 and 58, in order to maximize the signal-to-noise ratio, they may alternatively be made longer. Also, the direction of the tagging magnetization may be transverse to the axis of the conduit 10 rather than parallel thereto, provided one or both of the $H_1$ coil and the receiver coil are repositioned so that both are orthogonal with each other and with the direction of the tagging magnetization. Further, the ramp-type characteristic of $H_0$ eff. illustrated in FIG. 6 may be obtained by varying the $H_1$ frequency along the flow path while keeping the $H_1$ amplitude relatively constant.

What is claimed is:

1. A detector for detecting a resonance condition in a fluid having gyromagnetic nuclei, comprising conduit means for conducting said fluid sequentially past a tagging station and a detection station, tagging means disposed at said tagging station for selectively giving a bolus of said fluid a polarized net magnetization, first field generating means disposed at said detection station for generating within said conduit a unidirectional field, having a constant amplitude $H_0$, parallel with said polarized magnetization, second field generating means disposed at said detection station for generating within said conduit a field having a constant radio frequency and a constant amplitude $H_1$ transverse to said $H_0$ field, a receiving coil disposed at said detection station with its axis orthogonal with said $H_0$ and $H_1$ fields for developing signals responsive to the rotation, relative to a coordinate system rotating at said radio frequency, of said polarized magnetization as said bolus flows past said detection station, said first and second field generating means being positioned relative to the conduit such that the amplitudes of said $H_0$ and $H_1$ fields vary relative to each other along the longitudinal dimension of the conduit, such that $$H_0 - \frac{2\pi f}{\gamma} \gg H_1$$

at a location upstream of said receiving coil, where $f$ is the frequency of said $H_1$ field, and $\lambda$ is the gyromagnetic ratio of said fluid.

2. Apparatus according to claim 1, wherein the direction of the effective magnetic field rotates significantly from the $H_0$ direction as said fluid flows from said upstream location to said receiving coil, due to the change in the relative amplitudes of the $H_0$ and $H_1$ fields.

3. Apparatus according to claim 1, wherein the amplitude of said $H_0$ field has a gradient along the longitudinal dimension of said conduit, whereby $H_0$ at said location is equal to $2\pi f/\gamma$ near the center of said receiving coil.

4. Apparatus according to claim 3, wherein the rotation of the said net magnetization is adiabatic as said bolus flows from said tagging station to said receiving coil, whereby said net magnetization maintains the initial angle established with an effective field, where said effective field at each point along the conduit has, relative to said rotating coordinate system, a first component equal to $$H_0 - \frac{2\pi f}{\gamma}$$

and a second, transverse, component equal to $H_1$.

5. Apparatus according to claim 1, wherein $H_0$ is constant within the vicinity of and upstream from said receiving coil, relative to the longitudinal dimension of said conduit, $H_1$ has a gradient along the longitudinal dimension of said conduit within the vicinity of and upstream from said receiving coil, and $$H_0 - \frac{2\pi f}{\gamma}$$

has a constant value within the vicinity of and upstream from said receiving coil.

6. Apparatus according to claim 5, wherein the center of said receiving coil is displaced downstream from the central portion of said $H_0$ field, and said receiving coil is displaced upstream from the central portion of said $H_1$ field.

7. Apparatus according to claim 6, wherein said first field generating means comprises electromagnet means having a ferromagnetic core member and an energizing winding, said second generating means comprises a relatively flat, saddle-like coil secured to the exterior of said conduit, and said receiving coil comprises a solenoid surrounding said conduit and being coaxial therewith.

8. A detector for detecting the presence at a point in the path of movement of gyromagnetic nuclei which have been tagged by being given a polarized magnetization, comprising means for establishing a constant amplitude, unidirectional magnetic field in the path of said nuclei, means for establishing a constant amplitude radio frequency field transverse to said unidirectional field, means for estabilshing a gradient along the path of said nuclei in one of said fields for causing a rotation of the direction of the effective field operating on said nuclei, relative to a coordinate system rotating about an axis parallel with said unidirectional field with a frequency equal to said radio frequency, from a first attitude generally parallel with said magnetization to a second attitude transverse to said first attitude, and receiving means disposed within said unidirectional and radio frequency fields for generating a signal upon passage of said nuclei.

9. Apparatus according to claim 8 wherein the change in attitude of said effective field is adiabatic.

10. Apparatus according to claim 9, wherein the directions of said first and second attitudes define a plane normal to the direction of said radio frequency field.

References Cited

UNITED STATES PATENTS

| | | | |
|---|---|---|---|
| 3,155,941 | 11/1964 | Mims | 324—0.5 |
| 3,191,119 | 6/1965 | Singer | 324—0.5 |

OTHER REFERENCES

Blood Flowmeter Utilizing Nuclear Magnetic Resonance: IRE Transactions on Medical Electronics, December 1959, pp. 267–269, Bowman and Kudraucev.

Nuclear Magnetic Resonance in Flowing Fluids: Journal of Applied Physics, July 1961, pp. 1404–1405, Hirschell and Libelo.

RUDOLPH V. ROLINEC, Primary Examiner

M. J. LYNCH, Assistant Examiner

U.S. Cl. X.R.

73—194